United States Patent
Nowensky

[15] 3,639,981
[45] Feb. 8, 1972

[54] CUTTER FOR PIZZA PIES AND THE LIKE

[72] Inventor: Cecil Nowensky, 87 Coralberry Ave., Winnipeg, 17 Manitoba, Canada

[22] Filed: Mar. 3, 1970

[21] Appl. No.: 16,032

[52] U.S. Cl. ........................................... 30/114, 146/146 R
[51] Int. Cl. ........................................................... A47j 9/00
[58] Field of Search ................. 30/114; 146/140, 141, 146 R

[56] References Cited

UNITED STATES PATENTS 367,689   8/1887   Wilson ..................................... 30/114

FOREIGN PATENTS OR APPLICATIONS 582,498   10/1924   France ............................. 146/146 R
519,166   6/1931    Germany .......................... 146/146 R
347,156   1/1922    Germany ............................... 30/114

Primary Examiner—Andrew R. Juhasz
Assistant Examiner—Michael Koczo, Jr.
Attorney—Kent and Ade

[57] ABSTRACT

A turntable is mounted on a base to support the circular pizza pie or the like being cut. A knife is journaled by one end thereof in a slotted support near the periphery of the turntable, the slots permitting the edge of the knife to engage the turntable throughout its length. A spring normally biases the inner end of the knife in the down position so that a complete cut is made through the pizza.

1 Claims, 7 Drawing Figures

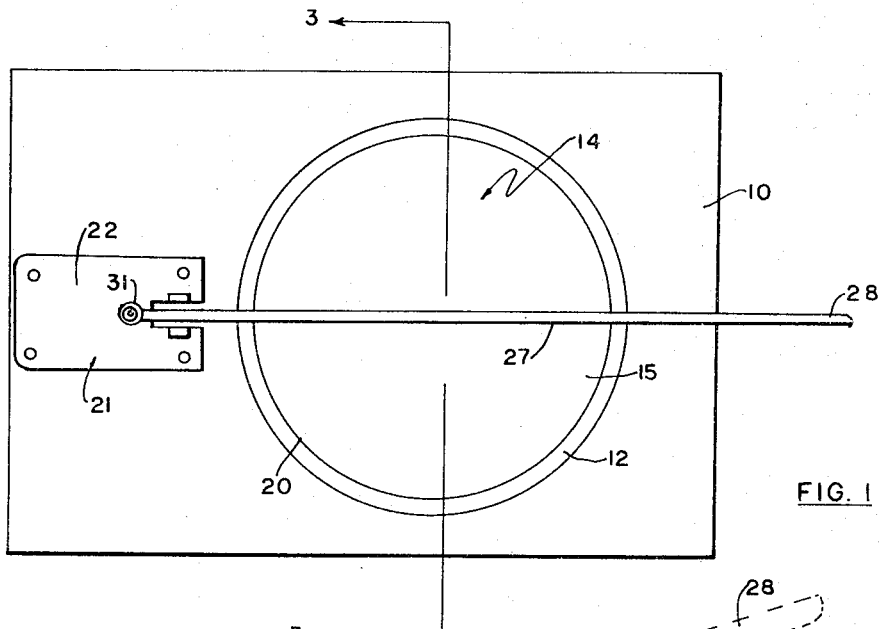
FIG. 1
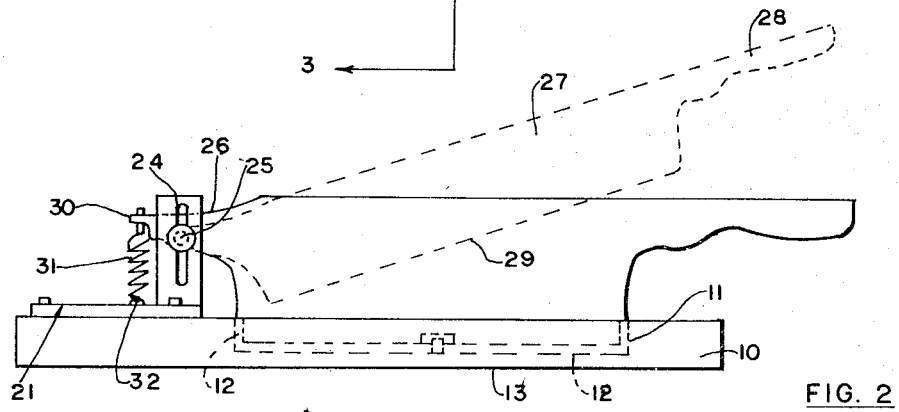
FIG. 2
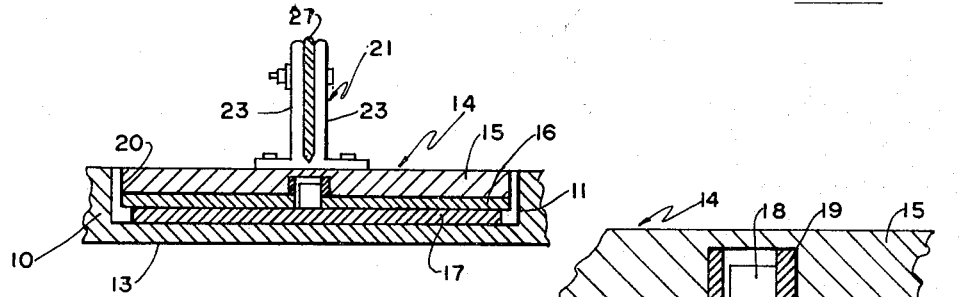
FIG. 3
FIG. 4
INVENTOR
CECIL NOWENSKY
BY 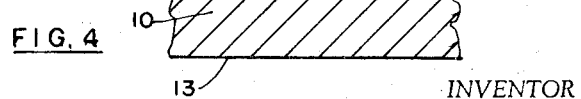
ATTORNEY

CUTTER FOR PIZZA PIES AND THE LIKE

This device relates to new and useful improvements for cutting pies, particularly pizza pies.

It is conventional to section pizza pies in pie shape segments before serving and it is well known that the crust and/or contents of the pizza particularly when hot, make it extremely difficult to perform this operation due to the consistency of the crust and/or contents. If an ordinary knife is used, the cutting action tends to drag the filling and spoil the appearance of the pizza for serving, particularly adjacent the central area thereof where all the cuts intersect.

I have overcome these disadvantages by providing a turntable upon which the pizza may be engaged and having a downwardly shearing knife blade which can cut clear through the pizza from one side to the other in one motion without any sawing action taking place. It is, of course, essential to ensure that the cutting edge of the knife blade engages right across the turntable and I have therefore provided slot means at one end with a relatively heavy duty spring normally pulling one end of the knife downwardly.

The device enables a pizza to be cut into four or eight portions of equal size and shape readily and easily, it being understood that four or eight portions are the normal method of cutting a pizza pie. Needless to say, of course, any number of segments can be cut by this device merely by rotating the turntable the required number of degrees before each cut.

The device is simple in construction, economical in manufacture and otherwise well suited to the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying figures in which:

FIG. 1 is a top plan view of the device.

FIG. 2 is a side elevation of FIG. 1.

FIG. 3 is a fragmentary sectional view substantially along the line 3—3 of FIG. 1.

FIG. 4 is a fragmentary enlarged sectional view showing the mounting of the turntable upon the base.

In the drawings like characters of reference indicate corresponding parts in the different figures.

Figure 5:
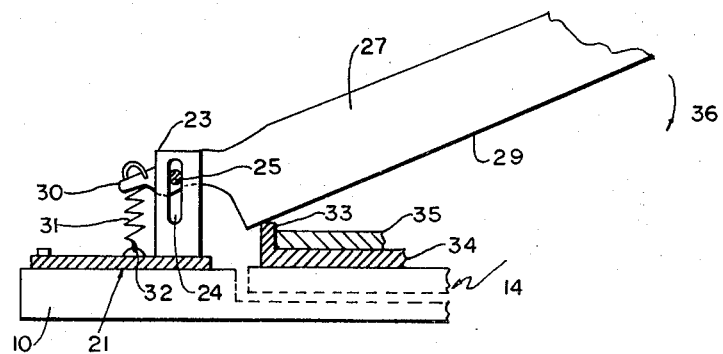
FIGS. 5, 6 and 7 are partially schematic side elevations showing the position of the knife at various stages of the cutting action.

Proceeding therefore to describe the invention in detail, reference character 10 illustrates a substantially rectangular base having a cylindrical recess 11 formed therein, the base 12 of the recess being parallel to but terminating above the underside or undersurface 13 of the base 10.

A cylindrical turntable assembly generally designated 14 is mounted within the recess for rotation and FIGS. 3 and 4 show details of this mounting.

The turntable itself 15 is preferably made from hardwood or the like and is provided with an antifriction plate 16 upon the underside thereof.

A plate or disc 17 also of antifriction material is seated within the recess 11 and is provided with a pivot pin or spindle 18 secured thereto and extending upwardly from the center of the disc 7.

A cylindrical bearing 19 is inserted within the underside of the turntable 15 and located centrally thereof and this bearing or bushing engages over the pin 18 so that the antifriction surfaces 16 and the disc 17 are in interfacial relationship as clearly shown in FIGS. 3 and 4.

This enables the turntable to be spun easily yet permits it toe removed readily for cleaning purposes.

Situated upon the base adjacent the periphery 20 of the turntable is a bracket assembly 21 consisting of a plate 22 and two spaced and parallel upstanding members 23. These members 23 are provided with vertical slots 24 therein and a pivot pin 25 extends through these slots and through an aperture (not illustrated) adjacent the end 26 of a knife 27.

This knife 27 is relatively heavy and includes a handle 28 at the other end thereof, the cutting edge 29 being upon the underside as clearly shown.

An extension 30 is formed integrally with the knife 27 and extends from the end 26 beyond the confines of the brackets or supports 23 and a relatively heavy duty tension spring 31 is hooked over this extension 30 and over an anchoring point 32 situated upon the bracket 21. The pivot pin 25 pivots the knife 27 within the brackets 23 and the slots 24 permit the pin together with this end of the knife to move vertically within limits against tension of spring 31.

This is to ensure that the cutting edge 29 may engage the entire surface of the turntable 15 when in the down position thus ensuring that the pie crust is cut clear through.

Figure 6:
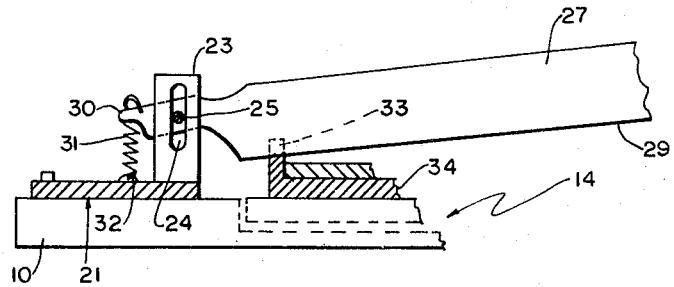
Figure 7:
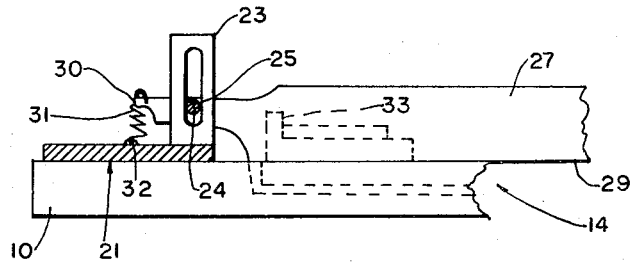

FIGS. 5, 6 and 7 show the general relationship of this end of the knife during the cutting action. Reference character 33 illustrates the upturned edge of a pizza pie and 34 illustrates the pastry base with reference character 35 indicating the filling.

The pie is placed upon the turntable assembly 14 and centrally located thereon whereupon the knife is moved downwardly in the direction of arrow 36. The cutting edge 29 first engages the upturned portion of the crust 33 adjacent the bracket 21. Downward pressure severs this crust and any resistance at this point causes the knife end 26 to move upwardly within the slots 24 against pressure of spring 31. However, as the action proceeds this spring 31 pulls the end downwardly again once the initial cut through the crust has been initiated and the initial resistance overcome so that the end of the stroke is as illustrated in FIG. 7 with the knife edge 29 engaging clear across the turntable surface thus ensuring that the crust is severed. This rocking action is a particular feature of my device and enables the pie to be sectioned readily and easily without the necessity of having diametrically formed slots in the turntable for the blade edge to enter. The provision of such slots tends to be rather unsanitary as they are extremely difficult to maintain in a clean condition.

Various modifications can be made within the scope of the inventive concept which is herein disclosed and/or claimed.

I claim:

1. In a pie cutter, the combination of a supporting base provided at the top thereof with a circular recess, an antifriction plate positioned at the bottom of said recess, an upstanding pin provided centrally on said plate, a circular turntable rotatably mounted on said pin and having its upper surface flush with the top of said base, an antifriction plate provided at the bottom of said turntable and rotatably superposed on said antifriction plate in said recess, a bracket secured to the top of said base adjacent the edge of the recess, said bracket having a vertical slot, a horizontal pivot pin movable vertically in said slot, a cutter knife mounted at one end thereof on said pivot pin and extending across the full diameter of said turntable, a projection on said knife protruding beyond said pivot pin, and a tension spring reacting between said bracket and said projection to bias the pivot pin downwardly toward said base.

* * * * *